March 24, 1970 R. B. CLAY 3,502,096
REVERSIBLE VALVE ACTUATING MECHANISM
Filed May 16, 1968
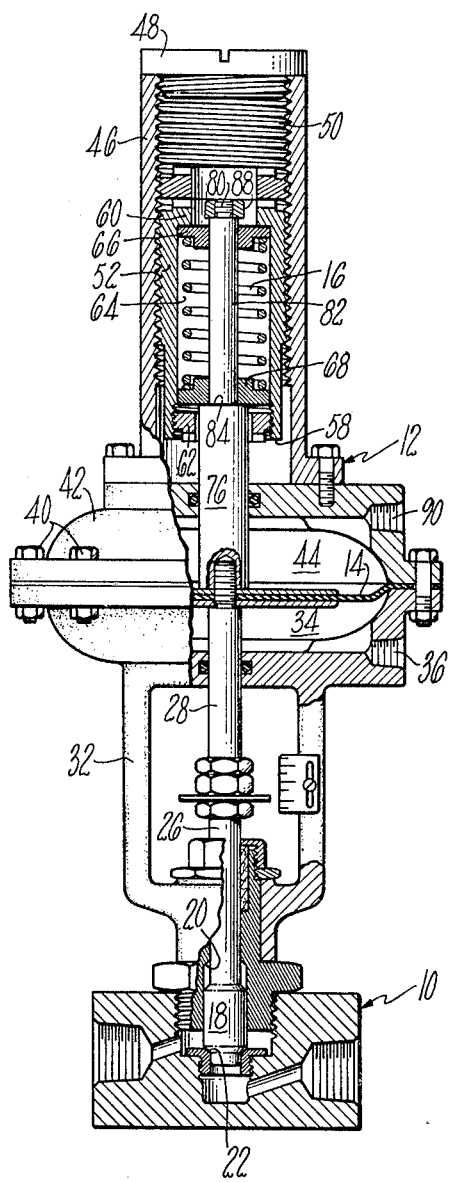
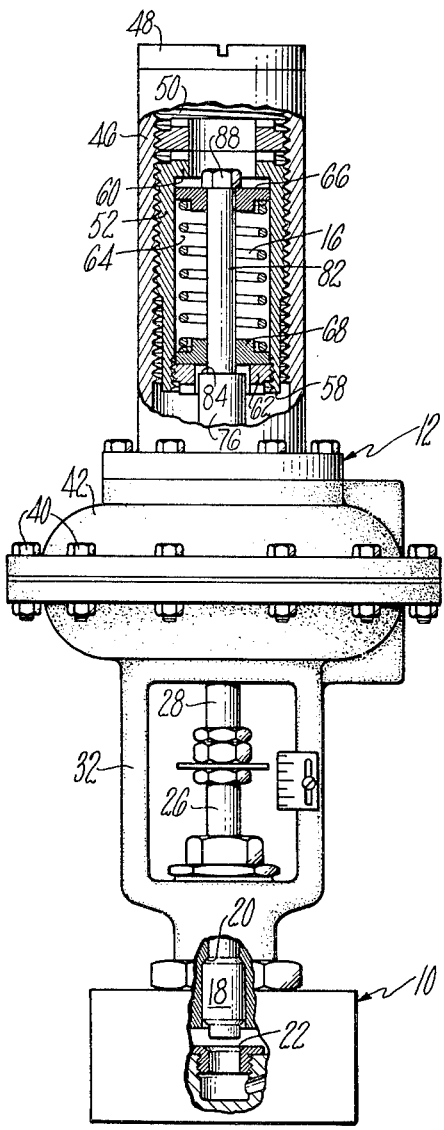
INVENTOR
ROBERT B. CLAY
BY Lindsey, Prutzman and Hayes
ATTORNEYS

United States Patent Office 3,502,096
Patented Mar. 24, 1970

3,502,096
REVERSIBLE VALVE ACTUATING MECHANISM
Robert B. Clay, Warren Township, N.J., assignor to
Skinner Precision Industries, Inc., New Britain,
Conn., a corporation of Connecticut
Filed May 16, 1968, Ser. No. 729,766
Int. Cl. F16k 31/12, 31/165
U.S. Cl. 137—270                                         5 Claims

ABSTRACT OF THE DISCLOSURE

A valve actuating mechanism for reversing valve operation without change or removal of parts includes a sleeve-like spring cage axially adjustable relative to the mechanism housing and defining a spring chamber of fixed size, the spring cage permitting free relative movement of an actuator stem in response to the driving action of both a fluid operated member and a compression spring.

BACKGROUND AND SUMMARY OF THE INVENTION

The present invention relates generally to fluid control valves and is more particularly concerned with a new and improved reversible control mechanism for converting the valve from normally open operation to normally closed operation and vice versa.

In the art of fluid control valves it has become increasingly desirable to have a valve actuating mechanism characterized by an ability to rapidly convert from normally open valve operation to normally closed valve operation and vice versa. Typical of such valve actuating mechanisms are the so-called "spring-diaphragm" or spring-piston actuators which utilize pressurized fluid acting on one side of a diaphragm or piston to move the valve out of its rest position and load a return spring and subsequent release of the pressure to permit the spring to return the valve to its rest position. Unfortunately, a great many of such valve actuating mechanisms require removal and/or displacement of one or more parts of the actuator in order to effect the desired reversal of operation. Such dismantling of the actuating mechanism frequently exposes the interior of the mechanism to adverse environmental conditions while at the same time introducing a human error factor and increasing the time and costs of not only conversion from one type of operation to another but also the maintenance and wear on those parts being dismantled.

Accordingly, it is a primary object of the present invention to provide a new and improved reversible valve actuating mechanism which may be simply, quickly and economically converted from normally open to normally closed or normally closed to normally open valve operation without disassembling or dismantling of either the valve or the actuating mechanism.

Another object of the invention is to provide a new and improved fluid control valve equipped with an actuating mechanism of the type described which facilitates easy field adjustment and facile conversion of operating characteristics without the necessity of removably changing even a single operative part thereof.

Still another object of the present invention is to provide a new and improved fluid operated valve actuating mechanism of the spring-diaphragm or spring-piston type which facilitates full spectrum adjustment of the load on the valve spring enabling not only modification of the operating pressure thereof but also complete reversal of valve operation, all without sacrifice of optimum operating efficiency.

A further object of the present invention is to provide a new and improved fluid operated valve actuating mechanism of the type described which exhibits simplicity and ease of manufacture coupled with rapid, facile and economical assembly and maintenance.

Other objects will be in part obvious and in part pointed out more in detail hereinafter.

These and related objects are accomplished by providing a fluid operated valve actuator having an adjustable sleeve defining a spring chamber, the sleeve permitting free relative movement of an actuator push rod responsive to the driving force of both a spring and a diaphragm. The sleeve is mounted within a housing for the mechanism and is axially adjustable therein to control both the force required for valve operation and the complete reversal of valve operating characteristics.

The invention accordingly consists in the features of construction, combination of elements and arrangement of parts which will be exemplified in the construction hereafter set forth and the scope of the application which will be indicated in the appended claims.

BRIEF DESCRIPTION OF THE DRAWING

In the drawing:

FIG. 1 is a side elevation, partially broken away and partially in section, of a fluid control valve including an embodiment of the reversible fluid controlled actuating mechanism of the present invention, the mechanism being illustrated in its normally closed valve operating condition; and FIG. 2 is a view similar to FIG. 1 depicting the valve and actuating mechanism of FIG. 1 adjusted to provide normally open valve operation.

DESCRIPTION OF THE PREFERRED EMBODIMENT

Referring now to the drawing in greater detail, wherein like reference numerals indicate like parts throughout the figures, a valve body 10 is shown fitted with an actuating mechanism, generally designated by the numeral 12, including a suitable pressure responsive diaphragm or piston 14 and return spring 16 for driving a valve plug 18 toward and away from top and bottom valve seats 20 and 22 respectively. As shown, the valve plug 18 is confined within the valve body and reciprocably moves between the full closed position illustrated in FIG. 1 wherein the plug 18 firmly sits on seat 22 and the fully open position illustrated in FIG. 2 wherein the plug abuts top or back seat 20. A coaxial valve rod or stem 26 integrally connected to the plug 18 for driving the plug between its fully open and fully closed positions extends upwardly and outwardly from the valve body 10 and is suitably connected to the diaphragm 14 by means of the thrust stem 28.

Securely affixed to the valve body 10 is the valve actuating mechanism 12 comprising a lower frame or yoke 32 having a pressure chamber 34 on the top thereof defined by the diaphragm 14. A fluid port 36 communicates with the chamber 34 and facilitates the influx of a pressurized driving fluid, such as compressed air. Thus, as is evident from FIG. 1, the upward movement of the diaphragm 14 is responsive to the pneumatic pressure within chamber 34 causing corresponding movement of the valve plug 18 away from the valve seat 22, the thrust stem 28 being fixedly secured to the diaphragm and coaxially connected with the valve rod 26.

Clamped to the lower frame 32 of the actuating mechanism 12 by the fasteners 40 is a top frame 42 including an upper pressure chamber 44 enclosing the diaphragm 14 and securely sealing the chambers within which the diaphragm operates. Coaxially mounted above the chamber 44 is a generally cylindrical spring cage housing 46 which can be conveniently closed by the end dust cap 48 for preventing exposure of the spring 16 to adverse environmental conditions. The housing is provided with an internal thread 50 on which is mounted a sleeve-like spring cage 52 positioned relative to the housing. The spring cage 52 has an integral flange 60 extending inwardly from the top edge of the sleeve and an internal threaded collar 62 fitted adjacent its bottom edge 58 to collectively define a spring chamber 64 of fixed size within which is movably confined the compression return spring 16 of the actuating mechanism. Top and bottom spring abutment guides 66 and 68 respectively are positioned on opposite ends of the return spring 16 and are retained within the spring chamber 64 by top flange 60 and bottom collar 62 but are free for axial movement within the spring chamber 64.

As actuator push rod or stem 76 affixed to the diaphragm 14 through a threaded interconnection with the thrust stem 28 extends upwardly away from the diaphragm and coaxially into the housing 46 so that the top free end 80 thereof is positioned adjacent the top of spring chamber 64. The push rod 76 is of smaller diameter than the opening provided by the sleeve collar 62 and therefore is free for reciprocable movement within the spring chamber relative to the sleeve-like cage 52. A rod portion 82 of reduced diameter is located within the spring chamber 64 and at its point of juncture with the remainder of the rod forms a shoulder 84 adapted to drivingly engage the bottom spring guide 68 for loading the spring 16 as the plug 18 moves away from seat 22 during the opening of the valve.

Thus, it will be appreciated that when the actuating mechanism is in the normally closed valve operating position shown in FIG. 1, the pneumatic force required to open the valve can be finely adjusted by lowering or raising the spring cage 52 on the threads 50 of the housing. For example, as the cage 52 is axially lowered by threading the cage downwardly within the housing 46, shoulder 84 on the actuator push rod 76 contacts the bottom spring guide 68, holding the guide against corresponding downward movement. At the same time the top flange 60 on the cage drives the top guide 66 downwardly to partially compress and load the return spring 16 and set the sealing force between the plug 18 and the valve seat 22 which will oppose the upward movement of diaphragm 14. Pressurized fluid caused to flow through port 36 into lower chamber 34 will cause an opposing or valve opening force to be exerted against diaphragm 14. When this force exceeds the pre-set spring force and the friction within the actuator mechanism, the valve will start to open and move the plug 18 upwardly against the bias of return spring 16. Further upward movement of the diaphragm will continue to open the valve until the plug 18 attains its fully open position by abutting the top or back seat 20 of the valve. As can be appreciated the spring 16 will return the plug 18 to a fully closed position when the pressure in the lower chamber 40 is relieved.

Conversely, by threadably raising the spring cage 52 from the position shown in FIG. 1, it is possible to decrease the fluid force necessary to open the valve since the loading of the return spring 16 is thereby reduced until a minimum value is attained.

Referring now to FIG. 2, it will be seen that the valve actuating mechanism can be readily converted to a normally open valve operation by simply continuing to raise the spring cage 52 beyond the position of minimum operating force mentioned hereinbefore. As the cage 52 is raised, the lower collar 62 of the sleeve moves toward the bottom spring guide 68, permitting the spring 16 to move the top spring guide 66 into contact with the retaining nut 88 threadably secured to the free end 80 of the push rod. The cooperative engagement between the nut 88 and the guide 66 together with the upward movement of the spring chamber and spring 16 will be effective to draw the diaphragm 14 and its depending thrust stem 28 upwardly until the plug 18 rests against the top or back seat 20 of the valve. Since thereafter the nut 88 will hold the top spring guide 66 against further upward movement, the continued upward movement of the sleeve 52 will cause the lower collar 62 to lift the bottom spring guide 68 away from the shoulder 84 and thereby partially load the spring as shown in FIG. 2 and adjustably fix the desired spring force of the plug against the back seat 20. The upper pressure chamber 44 is also provided with a fluid port 90 suited for supplying pressurized fluid to chamber 44 for driving the diaphragm 14 downwardly against the bias of spring 16. Thus, in much the same manner as set forth hereinbefore, the fluid force will be effective in moving the plug 18 out of its rest position and, with respect to the arrangement in FIG. 2, operate to close the valve. Again, upon release of the pressure from the chamber, the loaded spring 16 will return the valve to its rest position.

As is evident from the foregoing detailed description threaded axial displacement of the spring cage 52 permits gradual adjustment of valve operation, the adjustment modifying the valve operation from maximum line pressure for opening to maximum line pressure for closing with a reversal of valve operation at an intermediate point of minimum line pressure. It is also readily apparent that the mechanism lends itself to simple and easy manufacturing and assembling operations while eliminating the necessity for removing or dismantling any of the functioning parts thereof.

I claim:

1. A reversible valve actuating mechanism for rapid conversion between normally open valve operation and normally closed valve operation comprising a housing, a sleeve within the housing defining a spring chamber, an actuator stem reciprocably mounted in the housing for movement toward and away from a rest position and extending axially through an end opening of the sleeve into said spring chamber, said stem being of smaller size than the end opening of the sleeve permitting free relative movement between the stem and the sleeve, a spring enclosed within the chamber and surrounding the stem for urging the stem axially of the sleeve toward its rest position, a fluid operator mounted in the housing in axially spaced relationship to the sleeve and connected to the stem for reciprocable movement therewith, said operator being effective for driving the stem away from its rest position against the bias of the spring, the sleeve being axially adjustable within the housing to effect displacement of the spring chamber and reversal of the valve operation.

2. The reversible valve actuating mechanism of claim 1 including a pair of movable spring abutment members seated on opposite ends of the spring and retained within the spring chamber for movement therewith, one of said members being held against movement by the sleeve and the other of said members being in driving engagement with the stem for loading the spring upon movement of the stem away from its rest position.

3. The reversible valve actuating mechanism of claim 1 wherein the actuator stem is provided with a pair of fixedly spaced spring driving means alternately operable for loading the spring upon axial displacement of the spring chamber.

4. The reversible valve actuating mechanism of claim 1 wherein the fluid operator is positioned intermediate the spring and a valve controlled by the mechanism.

5. The reversible valve actuating mechanism of claim 1 in combination with a valve having a valve seat, a valve plug movable toward and away from the seat to respectively close and open the valve and a valve stem drivingly connected to the plug and adapted for synchronous reciprocable movement with the actuator stem to effect normally open and normally closed valve operation upon displacement of the spring chamber.

References Cited

UNITED STATES PATENTS 2,697,599  12/1954  Vandal _____ 137—270 XR
2,903,011  9/1959   Long _____ 137—270
2,956,574  10/1960  Cowan _____ 137—270 XR
3,168,011  2/1965   Baumann _____ 137—270 XR
3,304,949  2/1967   Baumann _____ 137—270

M. CARY NELSON, Primary Examiner

ROBERT J. MILLER, Assistant Examiner